Patented Dec. 11, 1934

1,984,097

UNITED STATES PATENT OFFICE 1,984,097

WATER-SOLUBLE ALKYL-MERCURY-MERCAPTO COMPOUNDS

Karl Streitwolf and Paul Fritzsche, Frankfort-on-the-Main, Germany, assignors to Winthrop Chemical Company, Inc., New York, N. Y., a corporation of New York No Drawing. Application April 13, 1933, Serial No. 666,067. In Germany April 16, 1932

11 Claims. (Cl. 260—13)

The present invention relates to water-soluble alkyl-mercury-mercapto compounds.

We have found that compounds of the following probable formula:

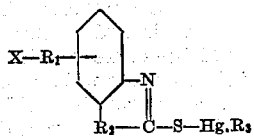

wherein $R_1$ stands for the radical of an acid group,
$R_2$ for O, S or the imino group,
$R_3$ for an alkyl or cycloalkyl group, and
X for hydrogen or an alkali metal salt,
show a valuable antiseptic effect when used, for instance, as disinfecting agents. These compounds may, for instance, be prepared by causing an alkyl-mercury compound to react with a benzene derivative having an acid group and a heterocyclic sulfur-containing ring, and then converting the acids thus obtained into the corresponding alkali metal salts. The alkyl-mercury radical is thereby linked to the mercapto group of the heterocyclic ring.

As alkali metal salts of the new compounds there can, for instance, be prepared the sodium salts, potassium salts and lithium salts. Acid groups are, for instance, the carboxylic acid group, the sulfonic acid group and the arsonic acid group. They may stand in the benzene nucleus in any position. Among the groups attached to the mercury there may, for instance, be named: methyl, ethyl, propyl, butyl, amyl, isoamyl, cyclohexyl, methylcyclohexyl.

The following examples illustrate the invention:

1. 7.93 grams of ethyl-mercuric chloride, prepared as described in "Journal für praktische Chemie" volume 120 (1929), page 274, are made into a paste with ethyl alcohol diluted with water. The paste is stirred for a prolonged time with a strongly alkaline solution of 8.2 grams of the sodium salt of 2-mercapto-benzoxazole-5-carboxylic acid. The thick colorless magma is filtered with suction, diluted in water, filtered and acidified with dilute sulfuric acid. The precipitated colorless organic mercury-containing acid is filtered by suction, well washed with water, then suspended in methyl alcohol and the suspension is made just alkaline to turmeric by adding drop by drop a dilute caustic soda solution. Small amounts of impurities are then eliminated by filtering with suction and the clear colorless filtrate is introduced into ether, while stirring. The precipitated colorless sodium salt of 1-ethyl-mercury-mercaptobenzoxazole-4-carboxylic acid of the following formula:

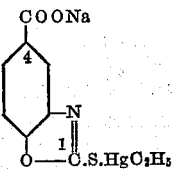

is filtered by suction and washed with ether. It is readily soluble in water and methyl alcohol, sparingly soluble in ethyl alcohol and insoluble in ether and acetone.

The 1-mercaptobenzoxazole-4-carboxylic acid serving as starting material is obtained by causing 3-amino-4-hydroxy-benzene-1-carboxylic acid to react with an alkali metal xanthate. When recrystallized from ethyl alcohol, the colorless acid decomposes at 283° C.–284° C., while foaming.

From 1-mercaptobenzoxazole-3-carboxylic acid there may be obtained, with the aid of ethyl-mercuric chloride and subsequent action of dilute caustic potash solution, the potassium salt of the 1-ethyl-mercury-mercaptobenzoxazole-3-carboxylic acid of the following formula:

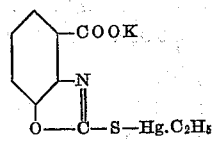

The potassium salt has the same properties as the product above described.

2. 12.96 grams of sodium 2-mercaptobenzimidazole-6-sulfonate are dissolved in an excess of caustic soda solution and the solution is introduced, while stirring, into an aqueous alcoholic suspension of 7.93 grams of ethyl-mercuric chloride. The dissolution is complete. By acidifying the solution, the mercury-containing acid is precipitated in the form of a thick colorless paste. The precipitate is filtered by suction and worked up to the sodium salt in a manner analogous to that described in Example 1. The sodium 2-ethyl-mercury-mercapto-benzimidazole-6-sulfonate of the following formula:

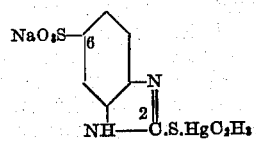

is a colorless powder, which is readily soluble in water and methyl alcohol, sparingly soluble in ethyl alcohol and insoluble in ether and acetone.

The 2-mercaptobenzimidazole-6-sulfonic acid serving as starting material is prepared in known manner by causing sodium 1.2-diaminobenzene-4-sulfonate to react with an alkali metal xanthate in an alcoholic solution. The sodium salt crystallizes from the solution in the form of colorless laminæ having a mother-of-pearl luster, which are readily soluble in water.

3. In the same manner as indicated in Example 2 there is obtained, by causing 8.63 grams of 2-mercaptobenzimidazole-5-arsonic acid (obtained according to Example 1 of the German Patent No. 531,801, dated March 15, 1928, in the name of I. G. Farbenindustrie Aktiengesellschaft) to react with 7.93 grams of ethyl-mercuric chloride in a strongly alkaline aqueous solution, the colorless sodium salt of 2-ethyl-mercury-mercaptobenzimidazole-5-arsonic acid of the following formula:

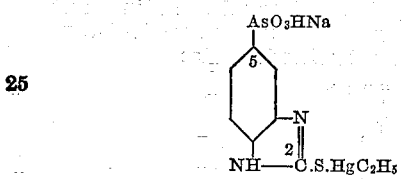

It has the same properties with respect to its solubility which are the same as those of the corresponding sulfonic acid compound.

4. Into an aqueous suspension of 8.33 grams of n-propyl-mercuric chloride, prepared according to "Journal für praktische Chemie" volume 120 (1929), page 275, there is run, while stirring, a solution of 8.2 grams of the sodium salt of 1-mercaptobenzoxazole-4-carboxylic acid in a strongly alkaline aqueous solution. The mixture is allowed to stand for a prolonged time, whereupon the thick colorless magma is filtered by suction; the solid matter is dissolved in water, the solution is filtered and acidified with dilute sulfuric acid. The precipitated colorless mercury-containing acid is filtered by suction, washed with water and worked up in the same manner as in Example 1 so as to produce the sodium salt of 1n-propyl-mercury - mercaptobenzoxazole-4-carboxylic acid of the following formula:

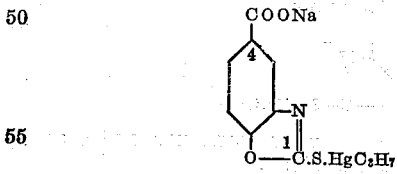

The colorless compound shows the same properties of solubility similar to those of the corresponding ethyl compound.

The alkyl radical linked to the mercury may, as in all compounds of this invention, be replaced by a higher aliphatic alkyl, for instance, butyl, amyl, isoamyl and others; also hydrogenated cyclic alkyl radicals are suitable.

5. Into an aqueous-alcoholic suspension of 7.93 grams of ethyl-mercuric chloride there is run, while stirring a strongly alkaline solution of 14 grams of 1-mercaptobenzthiazole-4-carboxylic acid. From the liquid which is first clear a yellow precipitate separates after a short time. The precipitate is filtered by suction, dissolved in water, and the solution filtered and acidified. The precipitated yellow organic mercury-containing acid is filtered by suction, suspended in methyl alcohol, the suspension made alkaline to turmeric by addition of caustic soda solution, freed from small amounts of impurities by filtration and the filtrate is entered into ether, while stirring. The precipitated sodium salt of 1-ethyl-mercury-mercaptobenzothiazole-4-carboxylic acid of the following formula:

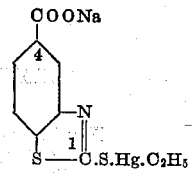

is filtered by suction and washed with ether. The yellow product is readily soluble in water and methyl alcohol, sparingly soluble in ethyl alcohol and insoluble in ether and acetone.

The starting material used is 3-nitro-4-chloro-1-benzoic acid, which is transformed by the action of an aqueous solution of sodium polysulfide into 3-amino-4-mercapto-1-benzoic acid and then converted, by reaction with potassium xanthate (cf. German Patent No. 519,987, dated March 21, 1928, in the name of I. G. Farbenindustrie Aktiengesellschaft, Example 6, where the preparation of the corresponding arsonic acid is described) into 1-mercaptobenzthiazole-4-carboxylic acid. The mercapto acid is a yellow powder, insoluble in water, readily soluble in methyl alcohol and dilute alkalies.

From the 1-mercaptobenzthiazole-6-carboxylic acid there can be obtained with the aid of cyclohexyl-mercuric chloride the 1-cyclohexyl-mercury-mercapto-benzothiazole-6-carboxylic acid, the alkali salts of which have the same properties as the product above described.

We claim:

1. The compounds of the following formula:

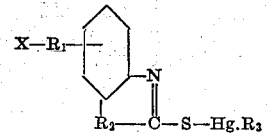

wherein $R_1$ stands for the radical of an acid group, $R_2$ for O, S or the imino group, $R_3$ for an alkyl or cycloalkyl group, and X for hydrogen or an alkali metal, said compounds having an antiseptic effect.

2. The compounds of the following formula:

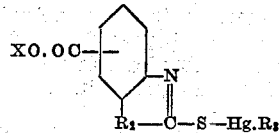

wherein $R_2$ stands for O, S or the imino group, $R_3$ for an alkyl or cycloalkyl group, and X for hydrogen or an alkali metal, said compounds having an antiseptic effect.

3. The compounds of the following formula:

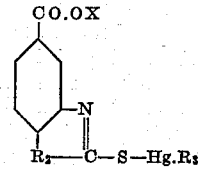

wherein $R_2$ stands for O, S or the imino group, $R_3$ for an alkyl or cycloalkyl group, and X for hydrogen or an alkali metal, said compounds having an antiseptic effect.

4. The compounds of the following formula:

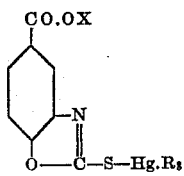

wherein $R_3$ stands for an alkyl or cycloalkyl group and X for hydrogen or an alkali metal, said compounds having an antiseptic effect.

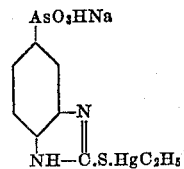

5. The compounds of the following formula: wherein $R_3$ stands for an alkyl group, said compounds being solid substances, readily soluble in water, insoluble in ether and acetone, and having an antiseptic effect.

6. The compound of the following formula:

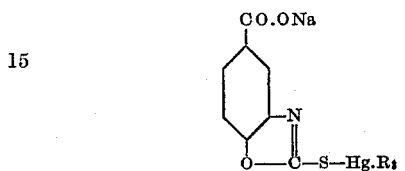

said compound being a solid substance, readily soluble in water, insoluble in ether and acetone, and having an antiseptic effect.

7. The compound of the following formula:

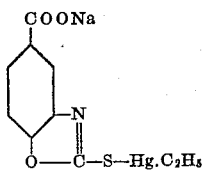

said compound being a solid substance, easily soluble in water, insoluble in ether and acetone, and having an antiseptic effect.

8. The compound of the following formula:

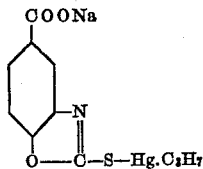

said compound being a solid substance, easily soluble in water, insoluble in ether and acetone, and having an antiseptic effect.

9. The compound of the following formula:

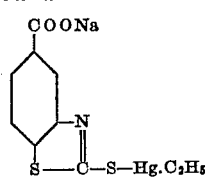

said compound being a solid substance, easily soluble in water, insoluble in ether and acetone, and having an antiseptic effect.

10. The compounds of the following formula:

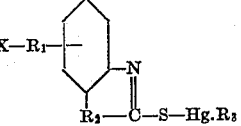

wherein $R_1$ stands for the radical of an acid group, $R_2$ stands for oxygen, $R_3$ for alkyl or cycloalkyl, and X for hydrogen or an alkali metal, said compounds having an antiseptic effect.

11. The compounds of the following formula:

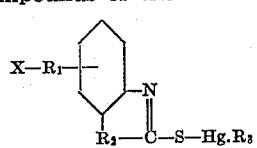

wherein $R_1$ stands for the radical of an acid group, $R_2$ stands for the imino group, $R_3$ for alkyl or cycloalkyl and X for hydrogen or an alkali metal, said compounds having an antiseptic effect.

KARL STREITWOLF.
PAUL FRITZSCHE.